Nov. 9, 1965 K. HINRICHS 3,217,264
WIDE-BAND ISOLATOR
Filed Jan. 5, 1962
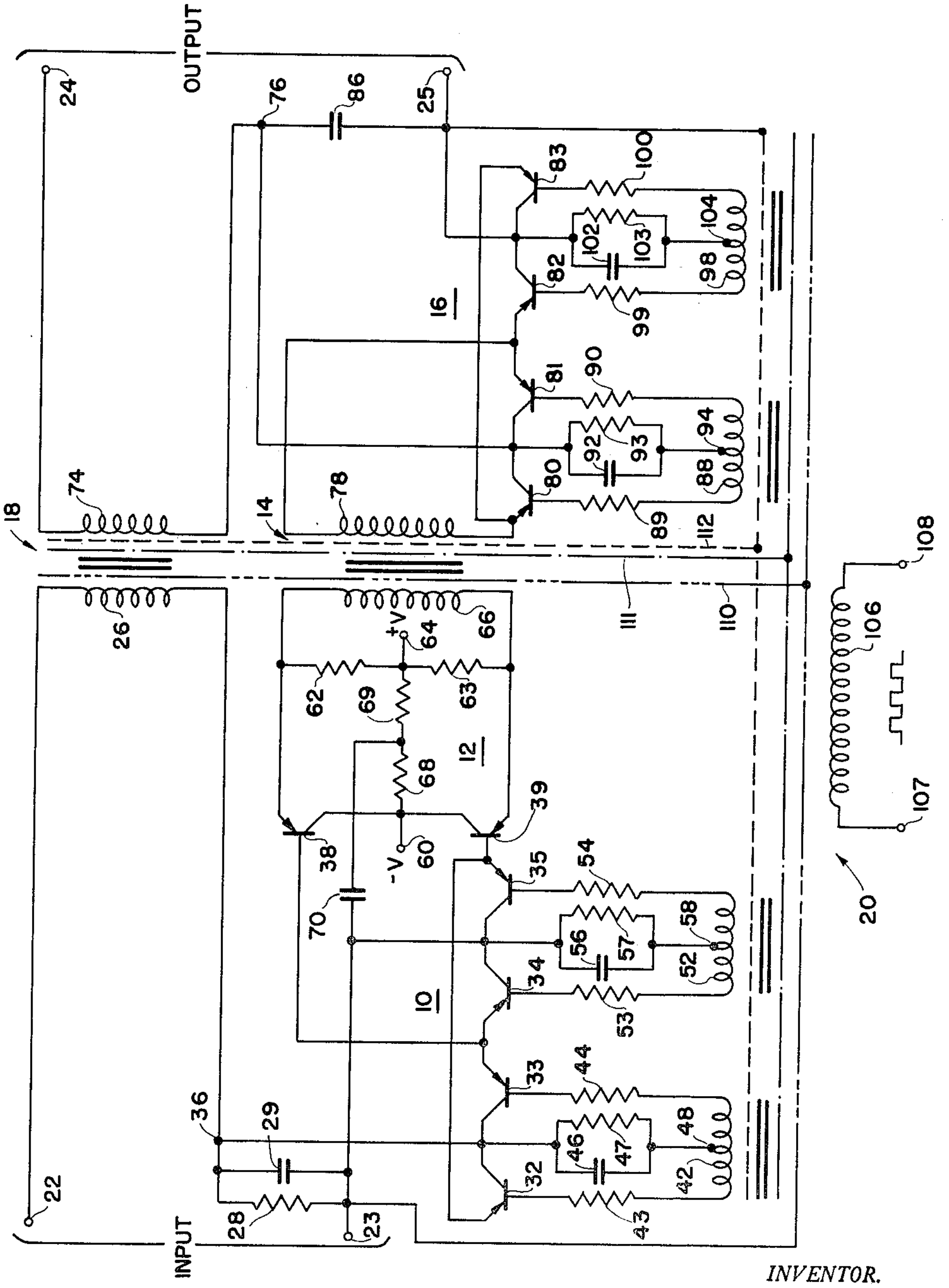
INVENTOR.
KARL HINRICHS
BY
Samuel B. Stone
ATTORNEY 3,217,264
WIDE-BAND ISOLATOR Karl Hinrichs, Fullerton, Calif., assignor to Beckman Instruments Inc., a corporation of California Filed Jan. 5, 1962, Ser. No. 164,458
4 Claims. (Cl. 330—10)

This invention relates to a transfer device and more particularly to a wide-band low pass isolator for precisely transferring signals in the frequency range of direct current to high frequency alternating current.

Transformers provide satisfactory conductive and electrostatic isolation between circuits for alternating current signals. However, transformers do not provide the desired transfer characteristics and isolation for either direct current signals or very low frequency alternating current signals. Arrangements for isolating circuits for signals ranging from direct current to very low frequency alternating current have employed a modulator connected through a transformer to a demodulator. A signal from the first circuit is transmitted as a modulated carrier from the modulator to the demodulator by the transformer. The signal is demodulated by the demodulator and applied to the second circuit. The prior isolators have suffered from the disadvantages of having either a high pass band or a low pass band, and frequently provide poor linearity and only low common-mode rejection. The prior isolators have not provided precise transfer of signals whereby the output is a precise replica of the input over a wide frequency span.

A feature of the present invention is the provision of a wide-band low pass isolator for precisely passing signals from direct current to high frequency alternating current, while providing high isolation between the input and the output thereof.

A further feature of the present invention is the provision of a precision wide-band isolator having high linearity and high common-mode rejection while also providing extermely high conductive and electrostatic isolation between the input and the output of the isolator.

An additional object of this invention is to provide precision frequency separation of two or more frequency components and precision reconstitution thereof into precise representations of input signals in a domain removed from that of the original signals by a variable common potential.

In accordance with the present invention, a wide-band isolator includes serially crossed-over tracks or paths. The first path includes a symmetrical modulator and demodulator, and a precision amplifier. This first path carries voltage signals from direct current to low frequency alternating current. The second path includes a transformer which is crossed-over on the primary and the secondary and carries signals from low frequency alternating current to high frequency alternating current.

Other features and objects of the invention will be better understood from a consideration of the following detailed description when read in conjunction with the attached drawing, the single figure of which illustrates a precision wide-band low pass isolator constructed in accordance with the teachings of the present invention.

Referring now to the drawing, a precision wide-band low pass isolator is shown which includes a modulator 10, a precision amplifier 12, a transformer 14, a demodulator 16 and a transformer 18. A transformer 20 is provided for supplying keying signals to the modulator 10 and the demodulator 16. A first circuit may be connected to input terminals 22 and 23, and a second circuit which is to be isolated from the first circuit may be connected to output terminals 24 and 25. Such an isolator may be employed in the feedback circuit of an amplifier to isolate the output of the amplifier from the input thereof as described and illustrated in the present inventor's copending U.S. patent application, Serial No. 151,604, entitled "Wide-Band Amplifier," filed November 13, 1961, and assigned to the assignee of the present invention. Also, such an isolator may be used for isolating any two circuits which require conductive and electrostatic isolation and wide-band low pass characteristics. This isolator provides precision frequency separation of two or more frequency components and precision reconstitution into precise representations of input signals in a domain removed from that of the original signals by a variable common potential, i.e., the output is removed from the input common mode signals. A feedback arrangement is not required to provide precision and to eliminate errors.

Considering the drawing in more detail, the input terminal 22 is connected through a primary 26 of the transformer 18, and through a parallel combination of a rolloff control resistance 28 and a capacitance 29 to the input terminal 23. The modulator 10 is connected across the parallel combination of the resistance 28 and the capacitance 29, and the output of the modulator 10 is connected to the amplifier 12. The modulator 10 includes four PNP transistors 32 through 35 connected as a ring modulator. A terminal 36, connected between the primary winding 26 and the parallel combination of the resistance 28 and capacitance 29, is connected to the collectors of transistors 32 and 33. The input terminal 23 is connected to the collectors of the transistors 34 and 35. The emitters of the transistors 33 and 34 are connected together and to the base of a PNP transistor 38 in the amplifier 12. The emitters of the transistors 32 and 35 are connected together and to the base of a PNP transistor 39 in the amplifier 12. A secondary winding 42 of the transformer 20 is connected through a resistance 43 to the base of the transistor 32, and through a resistance 44 to the base of the transistor 33. A parallel circuit including a capacitance 46 and a reistance 47 is connected from the collectors of the transistors 32 and 33 to a center tap 48 on the secondary winding 42. In a like manner a secondary winding 52 of the transformer 20 is connected through resistances 53 and 54 to the respective bases of the transistors 34 and 35. A parallel network including a capacitance 56 and a resistance 57 is connected from the collectors of the transistors 34 and 35 to a center tap 58 on the secondary winding 52.

The amplifier 12 includes the PNP transistors 38 and 39 connected as emitter followers. The collectors of the transistors 38 and 39 are connected together and to a terminal 60. The terminal 60 is connected to a negative potential source, not shown. The emitters of the transistors 38 and 39 are connected through respective resistances 62 and 63 to a terminal 64. The terminal 64 is connected to a positive potential source, not shown. The emitters of the transistors 38 and 39 also are connected to a primary winding 66 of the transformer 14. Resistances 68 and 69 are connected across the terminals 60 and 64. A capacitor 70 is connected from the junction of the resistances 68 and 69 to the collectors of the transistors 34 and 35 and to the input terminal 23.

A secondary winding 74 on the transformer 18 is connected to the output terminal 24 and to a terminal 76. A secondary winding 78 of the transformer 14 is connected to the demodulator 16. The demodulator 16 includes PNP transistors 80 through 83. The emitters of the transistors 80 and 83 are connected together and to the lower terminal of the secondary winding 78. The emitters of the transistors 81 and 82 are connected together and to the upper terminal of the secondary winding 78. The collectors of the transistors 80 and 81 are connected together and to the terminal 76. The collectors of the transistors 82 and 83 are connected together and to the output terminal 25. A capacitance 86 is connected across the terminal 76 and the output terminal 25. A secondary winding 88 of the transformer 20 is connected through a resistance 89 to the base of the transistor 80, and through a resistance 90 to the base of the transistor 81. A parallel circuit including a capacitor 92 and a resistance 93 is connected from the collectors of the transistors 80 and 81 to a center tap 94 of the secondary winding 88. In a like manner, a secondary winding 98 of the transformer 20 is connected through resistances 99 and 100 to the respective bases of the transistors 82 and 83. A parallel network including a capacitance 102 and a resistance 103 is connected from the collectors of the transistors 82 and 83 to a center tap 104 on the secondary winding 98.

The transformer 20 also includes a primary winding 106 having terminals 107 and 108. A keying drive, for example a 28 kilocycle square wave, is applied to the primary winding 106 of the transformer 20 to key the transistors 32 through 35 and 80 through 83. Both the modulator 10 and the demodulator 16 operate in synchronism since the same keying source is applied to both.

The transformers 14, 18 and 20 may be shielded in the manner shown if desired. Each of the transformers may include a shield 110, a shield 111 and a shield 112. These shields may be connected with equipment associated with the present isolator in the manner described in the above referred to copending U.S. patent application entitled "Wide-Band Amplifier." The shields 110 of each transformer may be connected together and to the input terminal 23. The shields 111 may be connected together and to the shield of associated equipment. The shields 112 are connected together and to the output terminal 25. If the isolator is employed as a feedback isolator for an amplifier, the input terminals 22 and 23 are connected with the output of the amplifier, the output terminals 24 and 25 may be connected with the input of the amplifier, and the shield 111 may be connected with the shield of the component or circuit connected to the input of the amplifier.

The input and the output of the isolator provide serially crossed-over paths or tracks, one of which handles relatively low frequency (including direct current) voltages and the other of which handles relatively higher frequency alternating voltages. For example, the band pass of the isolator may be from direct current to well over 100 kilocycles (and may be magacycles depending upon the use of additional precision components and transformers). The upper path shown in the drawing which includes the transformer 18 may be termed the fast path and handles the higher frequency voltages. An amplifier is not employed in this path since it may adversely affect the cross-over characteristics of the isolator and the phase shift of the signal. The lower path which includes the modulator 10, the amplifier 12, the transformer 14 and the demodulator 16 handles the realtively lower frequency (including direct current) voltages. The cross-over may be, for example, at around 50 cycles per second. However, the rolloff is not sharp, but may extend over a range of kilocycles in the case of both the fast and the slow paths. It is noted that variations in components as a result of aging, temperature changes, etc., do not affect the accuracy of the isolator but merely affect the cross-over frequency. Furthermore, the transfer of potential from the input terminals 22 and 23 to the output terminals 24 and 25 by means of transformers whose primaries effectively are connected in series and whose secondaries effectively are in series provides a higher accuracy transfer device over a very wide range of frequencies including D.C. This is true because any chosen frequency component of the input must be applied across at least one of the paths or tracks and is reconstituted on the secondary side in a similar form. With such an arrangement, the rolloff characterisitcs of each path do not affect the accuracy of the over-all isolator. It is desirable that the input and the output filters (capacitors 29 and 86) be simple, and that the load applied to the isolator be a stable and known high impedance (for example, 100,000 ohms) to aid in maintaining the precise cross-over characterictics.

In the operation of the exemplary wide-band low pass isolator shown in the drawing, input voltage signals are applied to the input terminals 22 and 23. The higher frequency voltages are automatically separated by the cross-over circuit and applied through the transformer 18 to the terminals 24 and 76. The remaining lower frequency component of the signal is modulated in a conventional manner by the modulator 10 and applied to the emitter followers 38 and 39. The emitter followers 38 and 39 provide power gain. They serve to unload the input circuit of the isolator from driving the capacitances following the modulator while providing a stable voltage gain near unity. The emitter followers 38 and 39 provide a high input impedance and prevent energy drain from the input circuit for charge-discharge of modulator capacitances without introducing gain error.

The amplifier 12 amplifies the modulated carrier provided by the modulator 10, and supplies this modulated carrier through the transformer 14 to the demodulator 16. The demodulator 16 in turn demodulates the modulated carrier in a conventional full-wave bridge manner and applies the resulting voltages across the terminals 76 and 25 in additive relationship with the higher frequency voltages transferred by the transformer 18. The capacitor 29 across the input of the modulator 10 and the capacitor 86 across the output of the demodulator 16 serve as by-pass impedances for the higher frequency, or fast voltages.

According to an additional feature of this invention, more than one transformer may be provided in the path or track carrying the higher frequency voltages. In other words, instead of utilizing a single transformer 18 as shown in the accompanying drawing, additional transformers may be utilized for passing very high frequency, or very fast signals. Such additional transformer or transformers may be added in series with the transformer 18. Series cross-over networks (such as a capacitor or capacitors) may then be used to divide the high frequency voltages between the two transformers, one of the transformers handling higher frequencies than the other. Furthermore, a resistance may be connected across the secondary of each transformer with each of these resistances being connected in series across a potential divider, a portion of which would serve as the output of the isolator.

It now should be apparent that the present invention provides a wide-band low pass isolator which can precisely pass voltages from D.C. to high frequency A.C., and is characterized by high linearity and high common-mode rejection while also providing extremely high conductive and electrostatic isolation between the input and the output of the isolator.

Although particular components, frequencies of operation and frequency ranges have been discussed in connection with a specific embodiment of a circuit constructed in accordance with the teachings of the present invention, others may be utilized. Furthermore, it will be understood that although an exemplary embodiment of the present invention has been disclosed and discussed, other applications and circuit arrangements are possible and that the embodiment disclosed may be subjected to various changes, modifications and substitutions without necessarily departing from the spirit of the invention.

What is claimed is:

1. A wide-band low pass isolator having an input circuit and an output circuit and providing conductive and electrostatic isolation between said input circuit and said output circuit comprising a first transformer having a primary winding and a secondary winding, an impedance, said input circuit including said impedance connected in series with said primary winding, a solid-state modulator having an input connected across said impedance, a solid-state amplifier having an input conductively coupled to the output of said modulator, a second transformer having a primary winding and a secondary winding, the output of said amplifier being connected to the primary winding of said second transformer, a solid-state demodulator having an input connected across the secondary winding of said second transformer, a second impedance connected across the output of said demodulator, said output circuit including said second impedance connected in series with the secondary of said first transformer, and keying means connected with said modulator and said demodulator to operate said modulator and said demodulator in synchronism at a desired frequency.

2. A wide-band low pass isolator as in claim 1 wherein said solid-state amplifier includes a pair of transistors arranged in push-pull emitter-follower configuration, the bases of the transistors are connected across the output of said modulator, and the emitters of said transistors are connected across the primary winding of said second transformer.

3. A wide-band low pass isolator having an input circuit and an output circuit and for providing conductive and electrostatic isolation between said input circuit and said output circuit comprising a first transfer means for transferring low frequency signals including direct current voltage signals from said input circuit to said output circuit, a second transfer means for transferring signals of a relatively higher frequency than said low frequency signals from the input circuit to the output circuit, said first and said second transfer means having the said input circuits serially interconnected in said input circuit, said first and said second transfer means having the said output circuits serially interconnected in said output circuit, the inputs of said first and second transfer means being conductively and electrosatically isolated from the outputs of said first and second transfer means, and said first transfer means including a solid-state modulator, a pair of emitter-followers connected in push-pull manner, a transformer, and a solid-state demodulator, the output of said modulator being connected to the input of said emitter-followers which in turn have an output connected through said transformer to the input of said demodulator.

4. A wide-band low pass isolator having an input circuit and an output circuit and providing conductive and electrostatic isolation between said input circuit and said output circuit comprising serially crossed-over paths, a first of said paths including a transformer having a primary winding and a second winding for transferring fast voltages from said input circuit to said output circuit, a second of said paths including a modulator means, a transfer circuit means and a demodulator means interconnected in series as recited to transfer slow voltages from said input circuit to said output circuit, said transfer circuit means including a precision amplifier, said input circuit including the primary winding of said first transformer connected in series with the input of said modulator means, and said output circuit including the secondary winding of said first transformer connected in series with the output of said demodulator means.

References Cited by the Examiner

UNITED STATES PATENTS

| | | | |
|---|---|---|---|
| 2,933,691 | 4/60 | Stair | 330—10 |
| 3,079,568 | 2/63 | Werth | 330—10 X |

ROY LAKE, *Primary Examiner.*

NATHAN KAUFMAN, *Examiner.*